United States Patent
Zamfir et al.

(10) Patent No.: US 10,628,568 B2
(45) Date of Patent: Apr. 21, 2020

(54) BIOMETRIC RECOGNITION SYSTEM

(71) Applicant: FotoNation Limited, Galway (IE)

(72) Inventors: Adrian Zamfir, Bucharest (RO);
Andreea Oana Miu, Bucharest (RO);
Corneliu Florea, Bucharest (RO)

(73) Assignee: FotoNation Limited, Galway (IE)

(*) Notice: Subject to any disclaimer, the term of this patent is extended or adjusted under 35 U.S.C. 154(b) by 351 days.

(21) Appl. No.: 15/472,624

(22) Filed: Mar. 29, 2017

(65) Prior Publication Data

US 2017/0286658 A1    Oct. 5, 2017

Related U.S. Application Data

(60) Provisional application No. 62/316,225, filed on Mar. 31, 2016.

(51) Int. Cl.
*G06F 21/32* (2013.01)
*G06N 3/04* (2006.01)
(Continued)

(52) U.S. Cl.
CPC ......... *G06F 21/32* (2013.01); *G01C 19/5776* (2013.01); *G01P 15/18* (2013.01)

(58) Field of Classification Search
None
See application file for complete search history.

(56) References Cited

U.S. PATENT DOCUMENTS 7,236,156 B2    6/2007    Liberty et al.
7,773,118 B2    8/2010    Florea et al.
(Continued)

FOREIGN PATENT DOCUMENTS

WO    2016/020147 A1    2/2016
WO    2016/134942 A1    9/2016

OTHER PUBLICATIONS

O. Yurur, C.-H. Liu and W. Moreno, "Unsupervised posture detection by smartphone accelerometer", Electronics Letters Apr. 11, 2013 vol. 49 No. 8 (Year: 2013)*
(Continued)

*Primary Examiner* — Kambiz Zand
*Assistant Examiner* — Arezoo Sherkat

(57) ABSTRACT

A biometric recognition system for a hand held computing device incorporating an inertial measurement unit (IMU) comprising a plurality of accelerometers and at least one gyroscope is disclosed. A tremor analysis component is arranged to: obtain from the IMU, accelerometer signals indicating device translational acceleration along each of X, Y and Z axes as well as a gyroscope signal indicating rotational velocity about the Y axis during a measurement window. Each of the IMU signals is filtered to provide filtered frequency components for the signals during the measurement window. The accelerometer signals are combined to provide a combined filtered accelerometer magnitude signal for the measurement window. A spectral density estimation is provided for each of the combined filtered accelerometer magnitude signal and the filtered gyroscope signal. An irregularity is determined for each spectral density estimation; and based on the determined irregularities, the tremor analysis component attempts to authenticate a user of the device.

16 Claims, 3 Drawing Sheets

(51) Int. Cl.
    *G01P 15/18*     (2013.01)
    *G01C 19/5776*     (2012.01)

(56) References Cited

U.S. PATENT DOCUMENTS

| | | | |
|---|---|---|---|
| 8,180,208 | B2 | 5/2012 | Gallagher et al. |
| 8,994,657 | B2 | 3/2015 | Liberty et al. |
| 9,977,887 | B2* | 5/2018 | Bengtsson .......... G06F 21/6218 |
| 2005/0243061 | A1* | 11/2005 | Liberty ................ A61B 5/1171 |
| | | | 345/158 |
| 2012/0007713 | A1* | 1/2012 | Nasiri ................... G06F 1/1694 |
| | | | 340/5.81 |
| 2014/0278139 | A1* | 9/2014 | Hong ..................... A61B 5/486 |
| | | | 702/19 |
| 2016/0092731 | A1 | 3/2016 | Dainty et al. |
| 2016/0171804 | A1* | 6/2016 | Chaar ................. G07C 9/00071 |
| | | | 340/5.52 |
| 2016/0241554 | A1* | 8/2016 | Zizi ..................... H04L 63/0861 |
| 2017/0083693 | A1* | 3/2017 | Bengtsson .......... G06F 21/6218 |
| 2017/0258390 | A1* | 9/2017 | Howard ................... A61B 5/16 |
| 2018/0247036 | A1* | 8/2018 | Vincent .................. G06F 21/31 |

OTHER PUBLICATIONS

Little, et al., "Recognizing people by their gait: the shape of motion", Videre: Journal of Computer Vision Research, 1(2): 1-32, 1998.

Nixon, et al., "Automatic recognition by gait", Proceedings of the IEEE, 94 (11): 2013-2024, 2006 disclose using gait as a basis for biometric recognition.

Veluvolu, et al. "Estimation of physiological tremor from accelerometers for real-time applications", Sensors 11.3(2011): 3020-3036.

Neverova, et al., "Learning Human Identity from Motion Patterns", arXiv:1511.03908.

Jakubowski, et al., "Higher order statistics and neural network for tremor recognition", Biomedical Engineering, IEEE Transactions on, 49 (2): 152-159, 2002.

Soran, et al., "Tremor detection using motion filtering and SVM", In Pattern Recognition (ICPR), 2012 21st International Conference on, pp. 178-181, 2012.

Lee, et al., "A Multivariate Singular Spectrum Analysis Approach to Clinically-Motivated Movement Biometrics", Eusipco 2014, 1397-1401.

Siirtola, et al, "Recognizing human activities user-independently on smartphones based on accelerometer data", International Journal of Interactive Multimedia and Artificial Intelligence, 1 (5), 2012.

Li, et al., "Seeing Your Face Is Not Enough: An Inertial Sensor-Based Liveness Detection for Face Authentication", Proc. of the 22nd ACM SIGSAC Conference on Computer and Communications Security, pp. 1558-1569.

Corcoran, U.S. Appl. No. 62/265,277, filed Dec. 9, 2015.

Riviere, et al., "Adaptive cancelling of physiological tremor for improved precision in microsurgery", Biomedical Engineering, IEEE Transactions on, 45 (7): 839-846, 1998.

Stoica, et al., "Spectral analysis of signals", Pearson/Prentice Hall Upper Saddle River, NJ, 2005.

Andrade, et al., "Human Tremor: Origins, Detection and Quantification", INTECH Open Access Publisher, 2013.

Breiman, L. "Random forests", Machine learning, 45 (1): 5-32, 2001.

Hall, et al., "The WEKA data mining software: an update", ACM SIGKDD explorations newsletter, 11 (1): 10-18, 2009.

\* cited by examiner

BIOMETRIC RECOGNITION SYSTEM

FIELD

The present invention relates to a biometric recognition system.

BACKGROUND

It will be appreciated that computers or indeed any data processing device such as a camera, if left unsecured, can grant access to a user's private information, for example: email correspondence, address book, photographs, videos, any unsecured documents or potentially bank account details.

Biometric recognition refers to automatic identification of individuals using their physiological and/or behavioural characteristics. Biometric recognition can ensure that private or sensitive information is accessed only by a legitimate user and by nobody else. While biometric recognition systems may get extremely accurate even for large scale identification applications, usually their performance comes with the cost of a sense of intrusion which leads to low acceptability from users.

Jain, Anil, Hong, Lin, and Pankanti, Sharath, "*Biometric identification*", Communications of the ACM, 43 (2): 90-98, 2000 discloses the following bases for biometric recognition: DNA, ear (shape and structure of the cartilaginous tissue), face, facial, hand and hand vein infrared thermograms, fingerprint, gait, hand and finger geometry, iris, keystroke, odor, palm print, retinal scan, signature and voice. In addition, Unar, J. A., Seng, Woo Chaw, and Abbasi, Almas, "*A review of biometric technology along with trends and prospects*", Pattern Recognition, 47: 2673-2688, 2014 have added finger knuckle print and tongue print. Little, James and Boyd, Jeffrey, "*Recognizing people by their gait: the shape of motion*", Videre: Journal of Computer Vision Research, 1 (2): 1-32, 1998; and Nixon, Mark S and Carter, John N., "*Automatic recognition by gait*", Proceedings of the IEEE, 94 (11): 2013-2024, 2006 disclose using gait as a basis for biometric recognition.

Recently, human hand tremor has also been identified as a potential basis for biometric recognition. Human tremor can be categorized in two main classes: resting tremor (which can be noticed when the muscles are not contracted) and action tremor. Action tremor manifests during a voluntary muscle contraction and encompasses postural, kinetic, intentional, task-specific and isometric tremor. This is the type of tremor that is the most likely to appear when using a smartphone.

Veluvolu, Kalyana C and Mg, Wei Tech, "*Estimation of physiological tremor from accelerometers for real-time applications*", Sensors 11.3 (2011): 3020-3036 discloses a method to separate tremor (both voluntary and involuntary) data from noise in a raw sensor signal.

U.S. Pat. No. 7,773,118 discloses that involuntary tremor can be efficiently distinguished from voluntary movement or an action tremor.

Natalia Neverova, Christian Wolf, Griffin Lacey, Lex Fridman, Deepak Chandra, Brandon Barbello, Graham Taylor, "*Learning Human Identity from Motion Patterns*", arXiv:1511.03908 discloses using deep networks to determine the relevant features for identifying a person. The obtained biometric is a combination of gait, tremor and gesture.

U.S. Pat. Nos. 8,994,657 and 7,236,156 disclose a handheld device, such as a free space pointing device, which uses hand tremor as an input. One or more sensors within the handheld device detect a user's hand tremor and identify the user based on the detected tremor.

U.S. Pat. No. 8,180,208 discloses identifying a photographer by determining a steadiness signal related to movement of a camera held while capturing an image or video. The steadiness signal is compared to a set of steadiness signals to produce a set of similarity scores between the photographer holding the camera and known photographers; and the set of similarity scores is used to identify the photographer that has captured the image or video.

Mansur, Paulo Henrique G, Cury, Lacordaire Kemel P, Andrade, Adriano O, Pereira, Adriano A, Miotto, Guilherme Alessandri A, Soares, Alcimar B, and Naves, Eduardo LM, "A review on techniques for tremor recording and quantification", Critical Review in Biomedical Engineering, 35 (5), 2007 discloses classifying tremor as either: physiological tremor (which is present in all healthy people) or pathological tremor (associated with various diseases or conditions such as Parkinson disease). Mansur et al. concluded that physiological tremor has most energy in the [7-12] Hz domain, while pathological tremor has many components in lower ranges.

In attempting to distinguish between physiological tremor, essential tremor and Parkinsonian tremor, Jakubowski, Jacek, Kwiatos, Krzystof, Chwaleba, Augustyn, and Osowski, Stanislaw "Higher order statistics and neural network for tremor recognition", Biomedical Engineering, IEEE Transactions on, 49 (2): 152-159, 2002 relies on a multi-layer perceptron classification of features derived from high order statistics, while Soran, Bilge, Hwang, Jenq-Neng, Lee, Su-In, and Shapiro, Linda, "Tremor detection using motion filtering and SVM", In Pattern Recognition (ICPR), 2012 21st International Conference on, pp. 178-181, 2012 feeds a filter output to a Support Vector Machine (SVM).

Tracey K. M. Lee, Sharon S. W. Gan, J. G. Lim, Saeid Sanei, "A Multivariate Singular Spectrum Analysis Approach to Clinically-Motivated Movement Biometrics", Eusipco 2014, 1397-1401 discloses combining two types of sensors, namely accelerometers and force sensors, in studying tremor associated with neurological disorders.

In parallel, due to their inclusion in smartphones, a multitude of applications are based on inertial sensors:

For example, Šindelář, Ondřej and Šroubek, Filip, "Image deblurring in smartphone devices using built-in inertial measurement sensors", Journal of Electronic Imaging, 22 (1): 011003-011003, 2013 discloses removing camera shake without hardware stabilization.

Siirtola, Pekka and Röning, Juha, "Recognizing human activities user-independently on smartphones based on accelerometer data", International Journal of Interactive Multimedia and Artificial Intelligence, 1 (5), 2012 is aimed at user activity recognition.

David Crouse, Hu Han, Deepak Chandra, Brandon Barbello, Anil Jain, "*Continuous Authentication of Mobile User: Fusion of Face Image and Inertial Measurement Unit Data*", International Conference on Biometrics 2015 discloses using the accelerometer and gyroscope for determining the correct rotation of the camera and this information is used to rotate the model for the face recognition.

Yan Li, Yingjiu Li, Qiang Yan, Hancong Kong, Robert H. Deng, "*Seeing Your Face Is Not Enough: An Inertial Sensor-Based Liveness Detection for Face Authentication*", Proc. of the 22nd ACM SIGSAC Conference on Computer and Communications Security, pages 1558-1569 discloses filtering IMU sensors to remove tremor. The IMU sensors are then used for measuring the consistency between device movements and head pose changes in order to authenticate a live user's face.

SUMMARY

According to one aspect, there is provided a biometric recognition system as claimed in claim 1.

According to a second aspect, there is provided a biometric recognition system as claimed in claim 19.

Embodiments provide a biometric recognition system based on involuntary tremor detection using inertial sensors including accelerometer and gyroscope that can already be integrated into devices such smartphones.

Embodiments of the invention enable biometric recognition based on hand tremor while a user is engaged in real life scenarios.

Embodiments provide a discrimination power at least sufficient for relatively low security applications like automatically unlocking the smartphone only if it is held by the recognized owner.

Embodiments of the invention, once trained, are capable of reporting a result about holder's identity after about one second of holding. This is faster, less intrusive and less demanding than providing a PIN code, swipe unlocking or face recognition through front camera image processing.

Embodiments of the present invention require a user simply to hold a hand held device they wish to use in order to measure their biometric. As such embodiments readily meet the criteria for collectability and acceptability required of a biometric recognition system.

BRIEF DESCRIPTION OF THE DRAWINGS

An embodiment of the invention will now be described, by way of example, with reference to the accompanying drawings, in which.

DESCRIPTION OF THE EMBODIMENT

Figure 1:
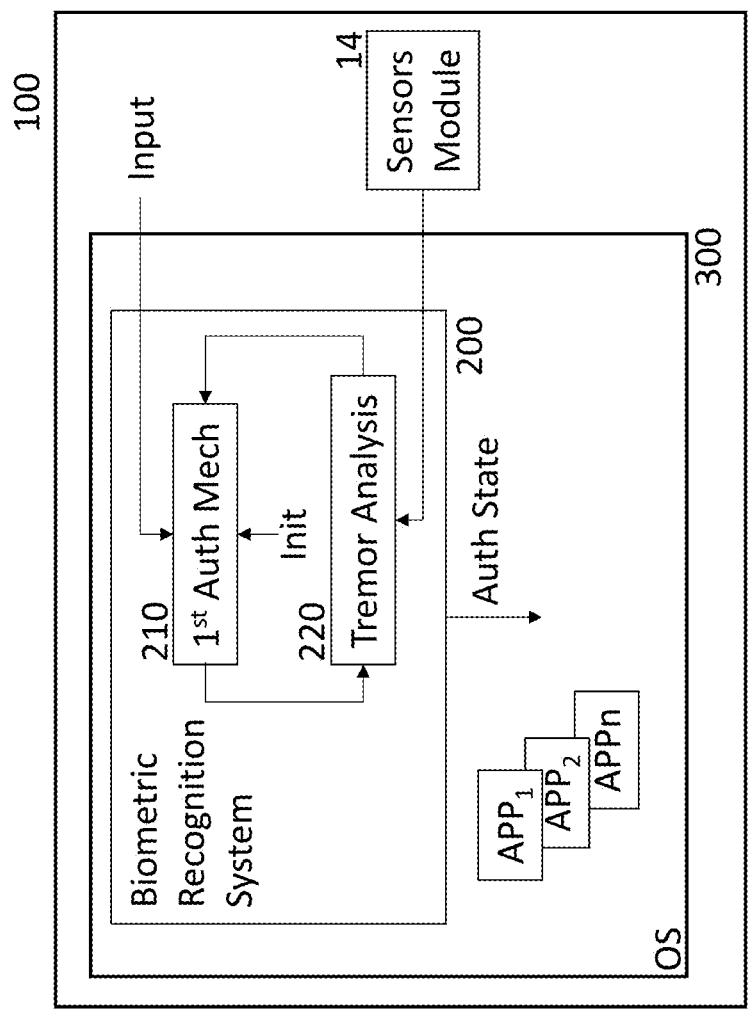
FIG. 1 shows schematically a handheld computing device incorporating a biometric recognition system according to an embodiment of the present invention.

Referring first to FIG. 1 there is shown a hand held computing device 100 incorporating a biometric recognition system 200 according to an embodiment of the present invention. The device 100 can comprise any of, for example, a smartwatch, a smartphone, tablet computer, digital camera or digital video camera. Furthermore, the device 100 does not necessarily need to be portable and could, for example, comprise a steering wheel or handlebar which a user is expected to hold in order to authenticate themselves to a vehicle.

The biometric recognition system 200 can either be implemented as a component of the operating system 300 of the device 100 or the system 200 can be implemented as a stand-alone application or plug-in for the device. In any case, the system 200 is arranged to signal an authentication state for a given user to the operating system or other applications 1 . . . N installed on the device, so that operating system functions or applications can be made available or not as appropriate to the authentication state of the device.

In the present embodiment, the biometric recognition system 200 includes a first user authentication mechanism 210 providing a relatively high level of security in first authenticating a given user. This authentication mechanism can comprise any form of mechanism including: password provision; smartcard, NFC card or similar token provision; or indeed a high security form of biometric recognition such as an iris based recognition system as disclosed in International PCT Application No. PCT/EP2015/065998 and U.S. patent application Ser. No. 14/962,909 (Ref: FN-397); International PCT Application No. PCT/EP2016/052395 (Ref: FN-452); or U.S. Provisional Patent Application 62/265,277 filed 9 Dec. 2015 (Ref: FN-466).

Clearly, in order to implement the $1^{st}$ authentication mechanism 210, the device 100 needs to be equipped with a suitable input for the $1^{st}$ authentication mechanism 210, for example, a keypad for password input, a suitable camera and possibly an infra-red light source such as disclosed in the above referenced applications for iris recognition, or in order to provide card or token based recognition, the device 100 needs to include a suitable reader.

Nonetheless, the implementation of the first user authentication mechanism 210 can be conventional and is not described further here. It is sufficient to say that once a user has authenticated themselves via this mechanism, the device moves from an initial unauthenticated (or locked) state to a first authentication state.

In the present embodiment, in normal operating made, once in the first authentication state, the device relies on sensing that it is being held by the authenticated user through a hand tremor analysis component 220 of the biometric recognition system 200 to change to a second authentication state, and as long as the device is being carried by the authenticated user, the device 100 can remain in the second authenticated state.

When in the second authenticated state, the device 100 can be completely unlocked and access is allowed to any application or operating system function. On the other hand, if the device is no longer being carried by the authenticated user, the device will revert back to the first authenticated state. In the first authenticated state, access to the device can be much more limited than in the second authenticated state and for example, a user may only be provided with access to say a music player or a maps application so that for example, the user can continue to listen to music or obtain navigation information while they are not holding the device. Regardless, it will be appreciated that no private or sensitive information should be available to a user when the device is in the first authentication state.

Figure 3:
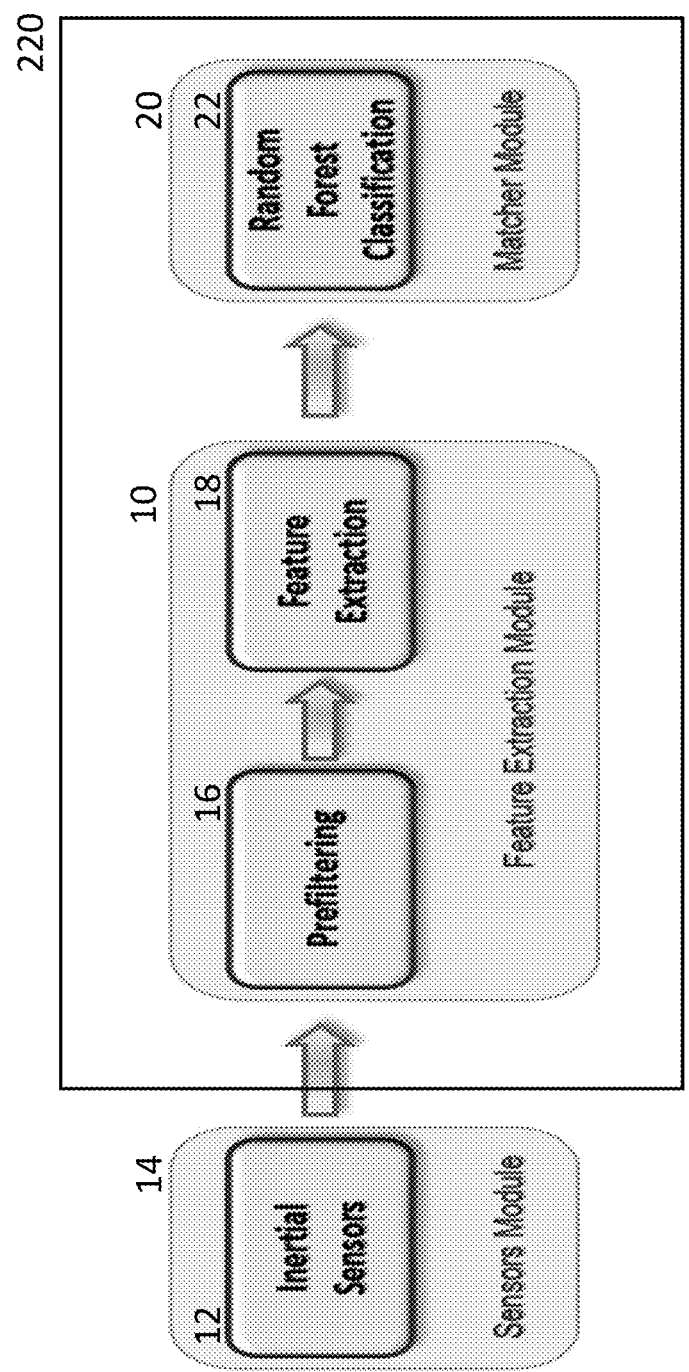
FIG. 3 shows schematically processing performed by the hand tremor analysis component of the biometric recognition system of FIG. 1.

Referring to FIG. 3, there is shown generally the processing performed by the hand tremor analysis component 220 of the biometric recognition system of FIG. 1. A first feature extraction module 10 collects data from inertial sensors 12 which are built into a sensors module 14 within the hand held device 100.

Figure 2:
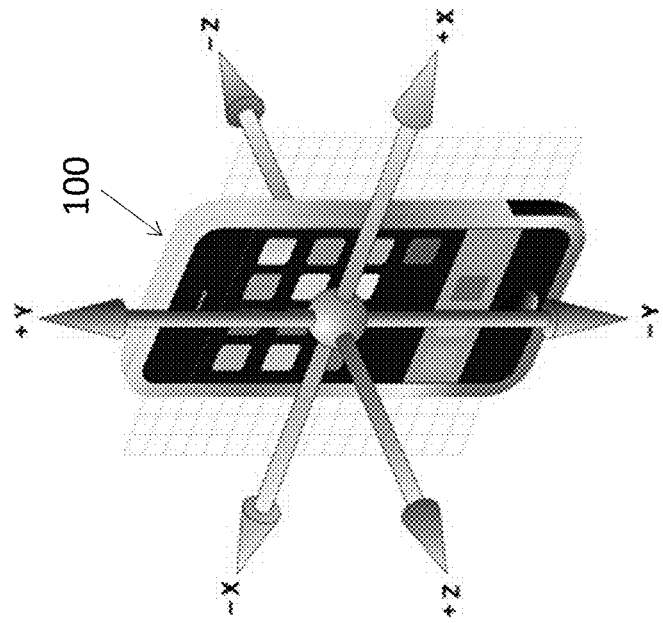
FIG. 2 shows the X, Y and Z axes for a typical smartphone incorporating a biometric recognition system according to an embodiment of the present invention.

As illustrated in FIG. 2, in typical smartphones, inertial sensors can comprise: 3-axis gyroscopes and accelerometers. Each of the three spatial axes (X,Y,Z) movement is recorded by an accelerometer (which measures translational acceleration) and by a gyroscope (which measures rotational velocity). Corresponding axes can be determined for other hand held devices, where each axis is indicative of a direction of movement or rotation of the device caused by a user's hand tremor.

(Note that the sensors module 14 can comprise a single unit or separate units for each of the accelerometer, gyroscope and possibly magnetometer.)

In one implementation, the gyroscope and accelerometer data is sampled at a rate of 100 Hz, but it will be appreciated that any higher frequency, while it comes with cost of more resources, may be beneficial for system accuracy.

Within the feature extraction module 10, two steps are performed: complex movement filtering 16 to extract the tremor data and actual feature extraction 18 to obtain the attributes employed for tremor classification.

In one embodiment, the pre-filtering stage 16 is based on the Weighted frequency Fourier Linear Combiner (WFLC) algorithm disclosed in Riviere, Cameron N, Rader, R Scott and Thakor, Nitish V, "Adaptive cancelling of physiological tremor for improved precision in microsurgery", Biomedical Engineering, IEEE Transactions on, 45 (7): 839-846, 1998. WFLC is an adaptive algorithm which builds on the work of Vaz, Christopher, Kong, Xuan, and Thakor, Nitish, "An adaptive estimation of periodic signals using a Fourier Linear Combiner (FLC)", Signal Processing, IEEE Transactions on, 42 (1): 1-10, 1994. FLC operates by adaptively estimating the Fourier coefficients for a known frequency model according to the least mean square (LMS) optimization algorithm. WFLC is an adaptive filter that can adapt to a quasi-periodic signal of an unknown frequency, amplitude and phase. WFLC models any such quasi-periodic signal as a modulating sinusoid and tracks its frequency, amplitude and phase. Given the sensor signal data and the WFLC parameters, explained in more detail below, WFLC estimates a tremor's main frequency (frequency band), amplitude, and phase while fitting the sensor signal to a tremor model. WFLC thus:

- attenuates the continuous component;
- attenuates some low frequency components (sub 4 Hz); and
- attenuates noise (greater than 15 Hz) components.

An alternative to WFLC is Bandlimited FLC, essentially a multiple band FLC, described in Veluvolu K C, Tan U X, Latt W T, Shee C Y, Ang W T "Bandlimited multiple Fourier Linear Combiner for real-time tremor compensation", Proc IEEE Eng Med Biol Soc. 2007; 2007: 2847-50.

In the present embodiment, each inertial sensor signal ($s_k$) as measured at a sampling instant k is provided as an input to the WFLC based pre-filtering stage 16. In the present embodiment, each of the sensor signals for the accelerometer X, Y and Z axes as well as the gyroscope Y axis signals are filtered using WFLC. An adaptive vector $w_k$ estimates the signal amplitude and phase and the frequency ($\omega_{0_k}$) of the signal. Depending on the instantaneous difference, $\varepsilon_k$, between the signal value ($s_k$) and the state vector, WFLC adjusts, at each iteration, $\omega_{0_k}$ and $w_k$. The problem is a typical convex optimization one and it is solved by the adjustment of the standard least mean square (LMS) algorithm.

The state vector $x_k = [x_{1_k} \ldots x_{2M_k}]^T$ used by the WFLC algorithm is composed of the sine and cosine functions computed using the frequency weight $\omega_{0_k}$ and M is the order of the Fourier series representing the measured inertial signal $s_k$ as follows:

$$x_{rk} = \begin{cases} \sin\left(r\sum_{t=0}^{k}\omega_{0_t}\right) & 1 \leq r \leq M \\ \cos\left((r-M)\sum_{t=0}^{k}\omega_{0_t}\right) & M+1 \leq r \leq 2M \end{cases} \quad (1)$$

The update is defined as follows:

$$\varepsilon_k = s_k - w_k^T x_k + \omega_{b_k} \quad (2)$$

$\omega_{b_k}$ is introduced in the computation of $\varepsilon_k$ to estimate and remove the bias present in the signal, due to possible low frequency components and/or drift. The initialization is:

$$\omega_{0_{k+1}} = \omega_{0_k} + 2\mu_0 \varepsilon_k \sum_{r=1}^{M} r(w_r x_{M+r} - w_{M+r} x_r) \quad (3)$$

while the unknown frequency and adaptive weight updates are:

$$w_{k+1} = w_k + 2\mu x_k \varepsilon_k \quad (4)$$

$$\omega_{b_{k+1}} = \omega_{b_k} + 2\mu_b \varepsilon_k \quad (5)$$

$\mu_0$, $\mu$, $\mu_b$ are the frequency, amplitude and bias adaptation gains, respectively; and in one embodiment $\mu_0 = 10^{-5}$, $\mu = 0.3$, $\mu_b = 2.5 \cdot 10^{-8}$ and $w_0 = 2$ have produced the best results for sensing hand tremor. The order of the Fourier series M used for representing the measured signal inertial signals $s_k$, was set to M=5.

As indicated above, each of the signal data for the accelerometer X, Y and Z axes and the gyroscope Y axis are filtered using WFLC as described above.

The combined filtered acceleration magnitude is calculated as follows:

$$A_{norm} = \sqrt{A_x^2 + A_y^2 + A_z^2} \quad (6)$$

where $A_x$, $A_y$ and $A_z$ are the WFLC filtered versions of the accelerometer signals.

The combined filtered accelerometer magnitude signal $A_{norm}$, the filtered X axis accelerometer signal $A_x$, as well as the filtered gyroscope Y axis magnitude signal are used in the tremor features extraction stage 18 as explained below.

As tremor is a quasi-periodic movement, a spectral density estimation can be used to characterize the frequency content of a signal and detect any periodicities in the data, by observing peaks at the frequencies corresponding to these periodicities. One technique to estimate the spectrum is the periodogram, given by the modulus squared of the discrete Fourier transform, as disclosed in Stoica, Petre and Moses, Randolph L. "Spectral analysis of signals", Pearson/Prentice Hall Upper Saddle River, N J, 2005.

Figure 4:
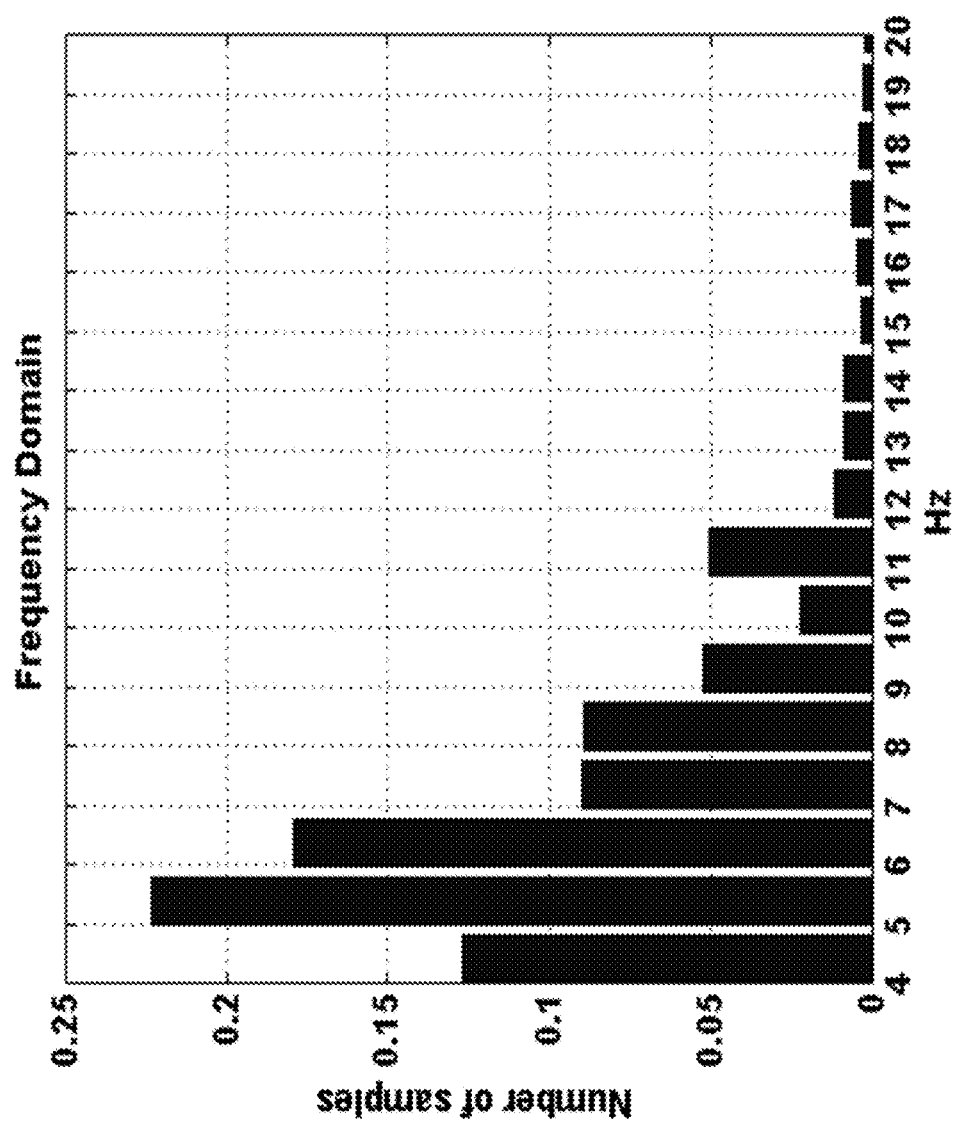
FIG. 4 shows the frequency components of interest for implementing embodiments of the present invention.

Referring now to FIG. 4, in accordance with Andrade, Adriano O, Pereira, Adriano Alves, Paixão, Ana Paula Souza, Cavalheiro, Guilherme Lopes, de Almeida, Maria Fernanda Soares, Fenelon, Sheila Bernardino, and Dionisio, Valdeci Carlos, "Human Tremor: Origins, Detection and Quantification", INTECH Open Access Publisher, 2013, it is thought that the bandwidth of the resting tremor is 4-7 Hz and the bandwidth for the kinetic tremor is 7-15 Hz. It will be seen that by employing a sampling frequency of about 100 Hz, enables a spectral density estimate incorporating this signal range to be captured and for the relevant features to be extracted from this estimate.

The features which are extracted from the respective periodograms are irregularity, and in the present embodiment, these are calculated as follows:

Periodogram Irregularity-K:

$$IK_p = \sum_{i=1}^{N-1} \left| p_m(i) - \frac{p_m(i-1) + p_m(i) + p_m(i+1)}{3} \right|$$

Periodogram Irregularity-J:

$$IJ_p = \frac{\sum_{i=1}^{N-1}(p_m(i) - p_m(i+1))^2}{\sum_{i=1}^{N-1}(p_m(i))^2}$$

where respective vectors $p_m$ hold the magnitude coefficient for the periodogram of the filtered accelerometer or gyroscope data, and N is the number of elements in $p_m$.

The features which enable the system to best identify an authorised user are listed in order of their significance below:

| Rank | Feature | Dataset |
| --- | --- | --- |
| 1 | Irregularity J Periodogram | Accelerometer Magnitude |
| 2 | Irregularity K Periodogram | Accelerometer X Axis |
| 3 | Irregularity J Periodogram | Gyroscope Y Axis |
| 4 | Irregularity K Periodogram | Accelerometer Magnitude |
| 5 | Irregularity K Periodogram | Gyroscope Y Axis |

These features are therefore produced by the feature extraction stage 18 and fed to a matcher module 20 which, when operating in normal mode, decides if the received extracted feature signals corresponds with those for an authorised user of the device. The module 20 aims to recognize an individual by testing values for the above features received from the features extraction stage 18 against a template for the user authenticated by the first user authentication mechanism 210.

Before the system 200 can operate in normal mode, it must first be trained to determine the tremor feature values for the user. In the embodiment, matching is based on the family of aggregated decision trees. This family has the advantage of having a good generalization error and being robust to various stresses. Some embodiments of the present invention employ a Random Forest classifier 22 such as disclosed in Breiman, Leo. "Random forests", Machine learning, 45 (1): 5-32, 2001. It has been found that a classifier comprising up to approximately 130 trees produces optimal results as beyond this number of trees, classification accuracy does not vary.

Other possible classifiers include a bagged ensemble of trees, K-nearest neighbour (KNN) based on Euclidean distance (K=7) or Support Vector Machine (SVM) based on Sequential Minimal Optimization (SMO) learning algorithm. Indeed any technique which measures the distance between the features extracted from signals during a measurement window and stored features for a user can be employed.

In training mode, it is useful for a user to employ the device 100 in a variety of cases and over a period of time. For example, the user might take pictures, record videos, walk while holding the device with either: both hands; just one hand; or indeed with a variety of grips. Training might also take place at various moments of the day and indeed over more than one day, to include examples where a user is more relaxed or more tired.

WEKA machine learning toolkit, as disclosed in Hall, Mark, Frank, Eibe, Holmes, Geoffrey, Pfahringer, Bernhard, Reutemann, Peter, and Witten, Ian H., "The WEKA data mining software: an update", ACM SIGKDD explorations newsletter, 11 (1): 10-18, 2009 can be used to train the decision tree for the matcher module 20.

As mentioned, a user may allow the system to remain in training mode for a number of days or to train over a number of days to allow the tremor analysis component to gather a sufficient number and variety of samples to characterize the user.

During this period, the user may pick up and leave go the device and so it is important that inertial sensor signals are recorded for periods during which the user is known to be carrying the device.

In any case, once training is complete, the user can now switch the system into normal mode. When in normal mode, the tremor analysis component 220 periodically obtains sets of sensor signal samples—this can be as frequently as security requires without the system 200 unduly imposing a processing overhead. It has been found that samples from a window length of about 1 second can be sufficient to verify identification—again these need to be taken during a period where it is known that the user is carrying the device.

As explained above, each of the three accelerometer and the Y axis gyroscope signals are sampled at about 100 Hz within the 1 second window and these samples are then filtered, spectral density estimations generated, irregularities for the estimations (periodograms) calculated before the values are fed to the trained matcher module 22 to determine if the features for the detected tremor are sufficiently similar to those derived from training to maintain the device in the second authentication state.

If not, the device reverts to the first authentication state where access to device applications and/or operating system functions is limited.

The user can then either leave this state by picking up the device and if their tremor is re-matched, the device will move back to the second authentication state; or if they re-submit to authentication by the first authentication mechanism 210, they can then either disable the recognition system 200 or switch the system back into training mode for further training.

One point of note is that once trained, the data for the matching classifier employed within the matching module 20 is ideally not transferred from one smartphone to another. This is because as will be seen from above, the most important features are computed on the accelerometer signal; and it is common for accelerometers to have a unique noise fingerprint.

Thus the specificity of accelerometer noise is incorporated when training the matcher module 20.

It is appreciated that tremor may not remain invariant over a long period of time, say greater than a number of weeks, and can vary due to injuries involving hand joints, certain medications, inebriety, muscle tiredness or weakness, normal aging, stress, anxiety or fatigue and also, as will be appreciated, certain ill persons can exhibit an augmented form of tremor (e.g. pathological tremor) characterized by lower dominant frequency and increased amplitude. Users may therefore choose to periodically re-train the tremor analysis component 220 to maintain its accuracy and reliability.

So while a tremor based biometric recognition system in itself may not be very reliable, it can be sufficiently discriminatory to maintain a hand held device in an unlocked state when a user has initially authenticated themselves using a higher security form of recognition. As such implementations of the present invention can be very simple, relatively easy to use and inexpensive, because they typically don't require additional sensors to be incorporated within a device which is already employing such sensors for other applications.

In further developments of the present embodiment, the matcher module 20 could be trained not alone to recognize a given user, but to provide an indication about a user's emotional state, grip or posture for use by other applications or operating system functions of the device 100. This could be very useful in a vehicular application where the system might detect if a user were tiring and could suggest that they stop driving.

The above embodiment has been described as maintaining authentication once this has been provided through a first high security authentication mechanism 210; however, the tremor analysis component 220 can also operate in parallel with the mechanism 210 to provide a liveness indicator when a user is first authenticating themselves to the device through the mechanism 210. Thus, tremor analysis in particular can be used to signal that a user identifying themselves through a first biometric based mechanism 210 is indeed live.

In variants of the above described embodiment, the sensors module 14 could also include a magnetometer, for example, a MEMS type magnetic field sensor, to indicate the orientation of the device relative to the Earth's magnetic field, and to assist the system 200 in determining the direction of the X, Y and Z axes.

The above embodiment is based on extracting irregularity measurements from a limited number of IMU sensor signal spectral density estimations. It will be appreciated nonetheless that as well as the Y axis signal, both X and Z axis gyroscope signals can also be employed. A number of further features can also be extracted from these individual accelerometer, combined accelerometer magnitude as well as multiple gyroscope signals including time domain features such as: Mean, Standard Deviation, Average deviation, RMS Amplitude and Highest Value; and frequency domain features calculated as follows:

| Feature Name | Description |
| --- | --- |
| Spectral Standard Deviation | $\sigma_s = \sqrt{\left(\sum_{i=1}^{N}(y_f(i))^2 y_m(i)\right) / \left(\sum_{i=1}^{N} y_m(i)\right)}$ |
| Spectral centroid | $C_s = \left(\sum_{i=1}^{N} y_f(i) y_m(i)\right) / \left(\sum_{i=1}^{N} y_m(i)\right)$ |
| Spectral skewness | $\gamma_s = \left(\sum_{i=1}^{N}(y_m(i) - C_s)^3\right) / \sigma_s^3$ |
| Spectral Kurtosis | $\beta_s = \left(\sum_{i=1}^{N}(y_m(i) - C_s)^4\right) / \sigma_s^4 - 3$ |
| Spectral Crest | $CR_s = (\max y_m(i)|_{i=1:to:N})/C_s$ |
| Irregularity-K | $IK_s = \sum_{i=1}^{N-1} \left| y_m(i) - \frac{y_m(i-1) + y_m(i) + y_m(i+1)}{3} \right|$ |
| Irregularity-J | $IJ_s = \dfrac{\sum_{i=1}^{N-1}(y_m(i) - y_m(i+1))^2}{\sum_{i=1}^{N-1}(y_m(i))^2}$ |

Also, further additional power spectrum features can be determined:

| Feature Name | Description |
| --- | --- |
| Periodogram Standard Deviation | $\sigma_p = \sqrt{\left(\sum_{i=1}^{N}(p_f(i))^2 p_m(i)\right) / \left(\sum_{i=1}^{N} p_m(i)\right)}$ |
| Periodogram centroid | $C_p = \left(\sum_{i=1}^{N}(p_f(i)) p_m(i)\right) / \left(\sum_{i=1}^{N} p_m(i)\right)$ |
| Periodogram skewness | $\gamma_p = \left(\sum_{i=1}^{N}(p_m(i) - C_p)^3\right) / \sigma_p^3$ |
| Periodogram Kurtosis | $\beta_p = \left(\sum_{i=1}^{N}(p_m(i) - C_s)^4\right) / \sigma_p^4 - 3$ |
| Periodogram Crest Top three periodogram frequencies | $CR_p = (\max p_m(i)|_{i=1:to:N})/C_s$ <br> $[H_1 H_2 H_3] =$ <br> $[(\text{Max}(p_m(i)|_{i=1\ to\ N_1}) (\text{Max}(p_m(i)|_{i=N_1\ to\ N_2})$ <br> $(\text{Max}(p_m(i)|_{i=N_1\ to\ N})]$ | where vector $p_f$ holds the bin frequencies.

It will be appreciated that deriving all of the above features for each measurement window would marginally improve accuracy, but at a commensurate cost in processing. Thus, further subsets of these features can be selected according to their significance in identifying a user.

The invention claimed is:

1. A biometric recognition system for a hand held computing device incorporating an inertial measurement unit (IMU) comprising a plurality of accelerometers and at least one gyroscope, said system comprising a tremor analysis component arranged to:

obtain from said IMU accelerometer signals indicating device translational acceleration along each of X, Y and Z axes as well as a gyroscope signal indicating rotational velocity about the Y axis during a measurement window;

filter each of said IMU signals to provide filtered frequency components for said signals during said measurement window;

provide a spectral density estimation for each of said filtered accelerometer magnitude signal and said filtered gyroscope signal;

determine an irregularity for each spectral density estimation, each spectral density estimation comprising a periodogram, wherein said irregularity comprises;

and irregularity ($IJ_P$) for said accelerometer magnitude and said gyroscope periodograms calculated as follows;

$$IJ_p = \dfrac{\sum_{i=1}^{N-1}(p_m(i) - p_m(i+1))^2}{\sum_{i=1}^{N-1}(p_m(i))^2},$$

and
an irregularity ($IK_P$) for said accelerometer magnitude and said gyroscope periodograms calculated as follows;

$$IK_p = \sum_{i=1}^{N-1} \left| p_m(i) - \frac{p_m(i-1) + p_m(i) + p_m(i+1)}{3} \right|$$

where $p_m$ holds the magnitude coefficient of each periodogram, and N is the number of elements in $p_m$; and
based on said determined irregularities, authenticating a user of said handheld computing device further comprising a first authentication component requiring a higher level of authentication than provided by said tremor analysis component, said system being responsive to said first authentication component authenticating a given user to place said handheld computing device in first authentication state and said tremor analysis component, being responsive to said handheld computing device entering said first authentication state to periodically verify said user to maintain said handheld computing device in a second authentication state, said second authentication state providing greater access to said handheld computing device than said first authentication state.

2. The system as claimed in claim 1 further comprising a first authentication component requiring a higher level of authentication than provided by said tremor analysis component, said system being responsive to said first authentication component and said tremor analysis component authenticating a given user to place said device in an authenticated state providing user access to said device.

3. The system as claimed in claim 1 wherein each spectral density estimation extends across a range from 4Hz to 15Hz.

4. The system as claimed in claim 1 wherein said tremor analysis component is arranged to provide an accelerometer X axis periodogram and to calculate an irregularity ($IK_P$) for said accelerometer X axis periodogram as follows:

$$IK_p = \sum_{i=1}^{N-1} \left| p_m(i) - \frac{p_m(i-1) + p_m(i) + p_m(i+1)}{3} \right|$$

where $p_m$ holds the magnitude coefficient of said accelerometer X axis periodogram, and N is the number of elements in $p_m$.

5. The system according to claim 1 wherein said filter comprises a Fourier linear (FLC) combiner for adaptively estimating the Fourier coefficients of said IMU signals.

6. The system according to claim 5 wherein said filter comprises one of: a weighted Fourier Linear Combiner (WFLC) or a Bandlimited FLC for adaptively estimating a quasi-periodic signal.

7. The system according to claim 1 wherein said matching module comprises a random forest classifier.

8. The system according to claim 7 wherein said classifier comprises no more than 130 trees.

9. The system according to claim 1 wherein said matching module comprises a bagged ensemble of trees classifier.

10. The system according to claim 1 wherein said measurement window is 1 second.

11. The system according to claim 1 wherein a sampling frequency of said IMU signals is at least 100Hz.

12. The system according to claim 1 wherein said tremor analysis component is operable in a normal mode for authenticating a user; and a training mode for obtaining signals indicative of said user's tremor.

13. A device incorporating an inertial measurement unit (IMU) comprising a plurality of accelerometers and at least one gyroscope and a biometric recognition system comprising a tremor analysis component arranged to;
obtain from said IMU accelerometer signals indicating device translational acceleration along each of X, Y and Z axes as well as gyroscope signal indicating rotational velocity about the Y axis during a measurement window;
filter each of said IMU signals to provide filtered frequency components for said signals during said measurement window;
provide a special density estimation for each of said filtered accelerometer magnitude signal and said filtered gyroscope signal;
determine an irregularity for each spectral density estimation, each spectral density estimation comprising a periodogram, wherein said irregularity comprises;
an irregularity ($IJ_P$) for said accelerometer magnitude and said gyroscope periodograms calculated as follows:

$$IJ_p = \frac{-\sum_{i=1}^{N-1} (p_m(i) - p_m(i+1))^2}{-\sum_{i=1}^{N-1} (p_m(i))^2},$$

and
and irregularity ($IK_P$) for said accelerometer magnitude and said gyroscope periodograms calculated as follows:

$$IK_p = \sum_{i=1}^{N-1} \left| p_m(i) - \frac{p_m(i-1) + p_m(i) + p_m(i+1)}{3} \right|$$

where $p_m$ holds the magnitude coefficient of each periodogram, and N is the number of elements in $p_m$; and
based on said determined irregularities, authenticating a user of said device further comprising a first authentication component requiring a higher level of authentication than provided by said tremor analysis component, said device being responsive to said first authentication component authenticating a given user to place said device in first authentication state and said tremor analysis component, being responsive to said device entering said first authentication state to periodically verify said user to maintain said device in a second authentication state, said second authentication state providing greater access to said device than said first authentication state.

14. A computer program product stored on a non-transitory computer readable medium which when executed on a handheld computing device incorporating an inertial measurement unit (IMU) comprising a plurality of accelerometers and at least one gyroscope is arranged to perform the steps of:
obtaining from the IMU, accelerometer signals indicating device translational acceleration along each of X, Y and Z axes as well as a gyroscope signal indicating rotational velocity about the Y axis during a measurement window;

filtering each of said IMU signals to provide filtered frequency components for said signals during said measurement window; providing a spectral density estimation for each of said filtered accelerometer magnitude signal and said filtered gyroscope signal;

determining an irregularity for each spectral density estimation, each spectral density estimation comprising a periodogram, wherein said irregularity comprises:

an irregularity ($IJ_P$) for said accelerometer magnitude and said gyroscope periodograms calculated as follows:

$$IJ_P = \frac{-\sum_{i=1}^{N-1}(p_m(i) - p_m(i+1))^2}{-\sum_{i=1}^{N-1}(p_m(i))^2},$$

and an irregularity ($IK_P$) for said accelerometer magnitude and said gyroscope periodograms calculated as follows:

$$IK_P = \sum_{i=1}^{N-1}\left|p_m(i) - \frac{p_m(i-1) + p_m(i) + p_m(i+1)}{3}\right|$$

where $p_m$ holds the magnitude coefficient of each periodogram, and N is the number of elements in $p_m$; and based on said determined irregularities, authenticating a user of said handheld computing device further comprising a first authentication component requiring a higher level of authentication than provided by said tremor analysis component, said handheld computing device being responsive to said first authentication component authenticating a given user to place said handheld computing device in first authentication state and said tremor analysis component, being responsive to said handheld computing device entering said first authentication state to periodically verify said user to maintain said handheld computing device in a second authentication state, said second authentication state providing greater access to said handheld computing device than said first authentication state.

15. A biometric recognition system for a hand held computing device incorporating an inertial measurement unit (IMU) comprising a plurality of accelerometers and at least one gyroscope, said system comprising a first authentication component requiring a higher level of authentication than provided by a tremor analysis component, said system being responsive to said first authentication component authenticating a given user to place said device in first authentication state; and said tremor analysis component, being responsive to said device entering said first authentication state to periodically verify said user to maintain said device in a second authentication state, said second authentication state providing greater access to said device than said first authentication state, the tremor analysis component being arranged to:

obtain from said IMU accelerometer signals indicating device translational acceleration along each of X, Y and Z axes as well as a gyroscope signal indicating rotational velocity about the Y axis during a measurement window;

filter each of said IMU signals to provide filtered frequency components for said signals during said measurement window;

provide a spectral density estimation for each of said filtered accelerometer magnitude signal and said filtered gyroscope signal; and based on features extracted from said spectral density estimates, attempt to verify said user of said device, wherein each spectral density estimation comprising a periodogram, and wherein said features comprise irregularities comprising:

an irregularity ($IJ_P$) for said accelerometer magnitude and said gyroscope periodograms calculated as follows:

$$IJ_P = \frac{-\sum_{i=1}^{N-1}(p_m(i) - p_m(i+1))^2}{-\sum_{i=1}^{N-1}(p_m(i))^2},$$

and an irregularity ($IK_P$) for said accelerometer magnitude and said gyroscope periodograms calculated as follows:

$$IK_P = \sum_{i=1}^{N-1}\left|p_m(i) - \frac{p_m(i-1) + p_m(i) + p_m(i+1)}{3}\right|$$

where $p_m$ holds the magnitude coefficient of each periodogram, and N is the number of elements in $p_m$.

16. A device incorporating an inertial measurement unit (IMU) comprising a plurality of accelerometers and at least one gyroscope, and a biometric recognition system comprising a first authentication component requiring a higher level of authentication than provided by a tremor analysis component, said biometric recognition system being responsive to said first authentication component authenticating a given user to place said device in first authentication state; and said tremor analysis component, being responsive to said device entering said first authentication state to periodically verify said user to maintain said device in a second authentication state, said second authentication state providing greater access to said device than said first authentication state, the tremor analysis component being arranged to;

obtain from said IMU accelerometer signals indicating device translational acceleration along each of X, Y and Z axes as well as gyroscope signal indicating rotational velocity about the Y axis during a measurement window;

filter each of said IMU signals to provide filtered frequency components for said signals during said measurement window;

provide a spectral density estimation for each of said filtered accelerometer magnitude signal and said filtered gyroscope signal; and based on features extracted from said spectral density estimates, attempt to verify said user of said device, wherein each spectral density estimation comprising a periodogram, and wherein said features comprise irregularities comprising;
and irregularity (IJ$_P$) for said accelerometer magnitude and said gyroscope periodograms calculated as follows;

$$IJ_p = \frac{-\sum_{i=1}^{N-1}(p_m(i)-p_m(i+1))^2}{-\sum_{i=1}^{N-1}(p_m(i))^2},$$

and
an irregularity (IK$_P$) for said accelerometer magnitude and said gyroscope periodograms calculated as follows:

$$IK_p = \sum_{i=1}^{N-1}\left|p_m(i)-\frac{p_m(i-1)+p_m(i)+p_m(i+1)}{3}\right|$$

where $p_m$ holds the magnitude coefficient of each periodogram, and N is the number of elements in $p_m$.

* * * * *